US008643696B2

(12) United States Patent
Kee

(10) Patent No.: US 8,643,696 B2
(45) Date of Patent: Feb. 4, 2014

(54) SYNCHRONIZING MEDIA STREAMS USING TIME SIGNAL(S) FROM AN INDEPENDENT TIME SOURCE

(75) Inventor: Tommy Wing Chau Kee, Richmond (CA)

(73) Assignee: Broadcom Corporation, Irvine, CA (US)

( * ) Notice: Subject to any disclaimer, the term of this patent is extended or adjusted under 35 U.S.C. 154(b) by 408 days.

(21) Appl. No.: 13/038,031

(22) Filed: Mar. 1, 2011

(65) Prior Publication Data

US 2012/0182383 A1 Jul. 19, 2012

Related U.S. Application Data

(60) Provisional application No. 61/434,257, filed on Jan. 19, 2011.

(51) Int. Cl.
*H04L 7/00* (2006.01)
*H04N 5/91* (2006.01)
*G06F 15/16* (2006.01)
*G11B 7/00* (2006.01)

(52) U.S. Cl.
USPC ............... 348/14.08; 348/14.12; 348/441; 348/485; 348/512; 369/47.31; 369/53.34; 370/356; 370/503; 375/240; 375/240.12; 375/240.26; 375/240.28; 375/357; 386/239; 398/79; 709/231; 709/248; 710/117; 719/328; 725/88

(58) Field of Classification Search
USPC ............... 348/14.08, 14.12, 485, 441, 512; 369/53.34, 47.31; 370/503, 356; 375/240.26, 356, 240, 240.12, 240.28, 375/357; 386/239; 709/231, 248; 719/328; 398/79; 725/88
See application file for complete search history.

(56) References Cited

U.S. PATENT DOCUMENTS 5,594,859 A 1/1997 Palmer et al.
5,602,592 A * 2/1997 Mori et al. ............... 375/240.12

(Continued)

FOREIGN PATENT DOCUMENTS

EP 1480461 11/2004
EP 2114053 11/2009
EP 2150062 2/2010
JP 2010-511357 A 4/2010

OTHER PUBLICATIONS

Boronat, F. et al., "Multimedia group and inter-stream synchronization techniques: A comparative study", vol. 34, No. 1, (Mar. 1, 2009), pp. 108-131.

(Continued)

*Primary Examiner* — Gerald Gauthier
(74) *Attorney, Agent, or Firm* — Fiala & Weaver P.L.L.C.

(57) ABSTRACT

Techniques are described herein that synchronize media streams using time signal(s) from an independent time source. An independent time source is a time source that is independent from (i.e., that is not connected to) an asynchronous data network via which the media streams are transferred. In accordance with the techniques described herein, media server(s) transfer the media streams to client(s) via an asynchronous data network. The independent time source provides the time signal(s) to the media server(s) and/or the client(s). If the time signal(s) are provided to the media server(s), the media server(s) may provide timing information that is based on the timing signal(s) to the client(s). The client(s) use the timing information from the media server(s) and/or the timing signal(s) from the timing source to synchronize the media streams.

20 Claims, 11 Drawing Sheets

(56) References Cited

U.S. PATENT DOCUMENTS

| | | | |
|---|---|---|---|
| 5,608,651 A * | 3/1997 | Leavy et al. | 348/14.12 |
| 5,751,694 A * | 5/1998 | Toft | 370/503 |
| 5,801,781 A * | 9/1998 | Hiroshima et al. | 348/441 |
| 6,061,399 A * | 5/2000 | Lyons et al. | 375/240 |
| 6,204,944 B1 * | 3/2001 | Uchiyama et al. | 398/79 |
| 6,236,432 B1 * | 5/2001 | Lee | 375/240.26 |
| 6,360,271 B1 | 3/2002 | Schuster et al. | |
| 6,404,711 B1 * | 6/2002 | Kato | 369/47.31 |
| 6,741,290 B1 * | 5/2004 | Wells | 348/512 |
| 7,075,994 B2 * | 7/2006 | Ihara | 375/240.28 |
| 7,133,347 B2 * | 11/2006 | Kato | 369/53.34 |
| 7,346,698 B2 * | 3/2008 | Hannaway | 709/231 |
| 7,787,578 B2 * | 8/2010 | Hsieh et al. | 375/357 |
| 8,028,097 B2 * | 9/2011 | Iwamura | 709/248 |
| 8,185,926 B1 * | 5/2012 | Oz et al. | 725/88 |
| 8,200,873 B2 * | 6/2012 | Tsukimori et al. | 710/117 |
| 8,385,413 B2 * | 2/2013 | Chen | 375/240.12 |
| 2008/0013917 A1 * | 1/2008 | Hegardt et al. | 386/66 |
| 2009/0007159 A1 * | 1/2009 | Rangarajan et al. | 719/328 |
| 2009/0257455 A1 * | 10/2009 | Sukkar et al. | 370/503 |
| 2010/0091188 A1 * | 4/2010 | Maiti et al. | 348/485 |
| 2011/0002429 A1 * | 1/2011 | Williams et al. | 375/356 |
| 2012/0182383 A1 * | 7/2012 | Kee | 348/14.08 |

OTHER PUBLICATIONS

European Search Report received for application No. 12000036.9 dated Apr. 24, 2013, 8 pages.

Office Action received for Korean Patent Application No. 10-2012-0006389, mailed on Apr. 29, 2013, 5 pages.

* cited by examiner

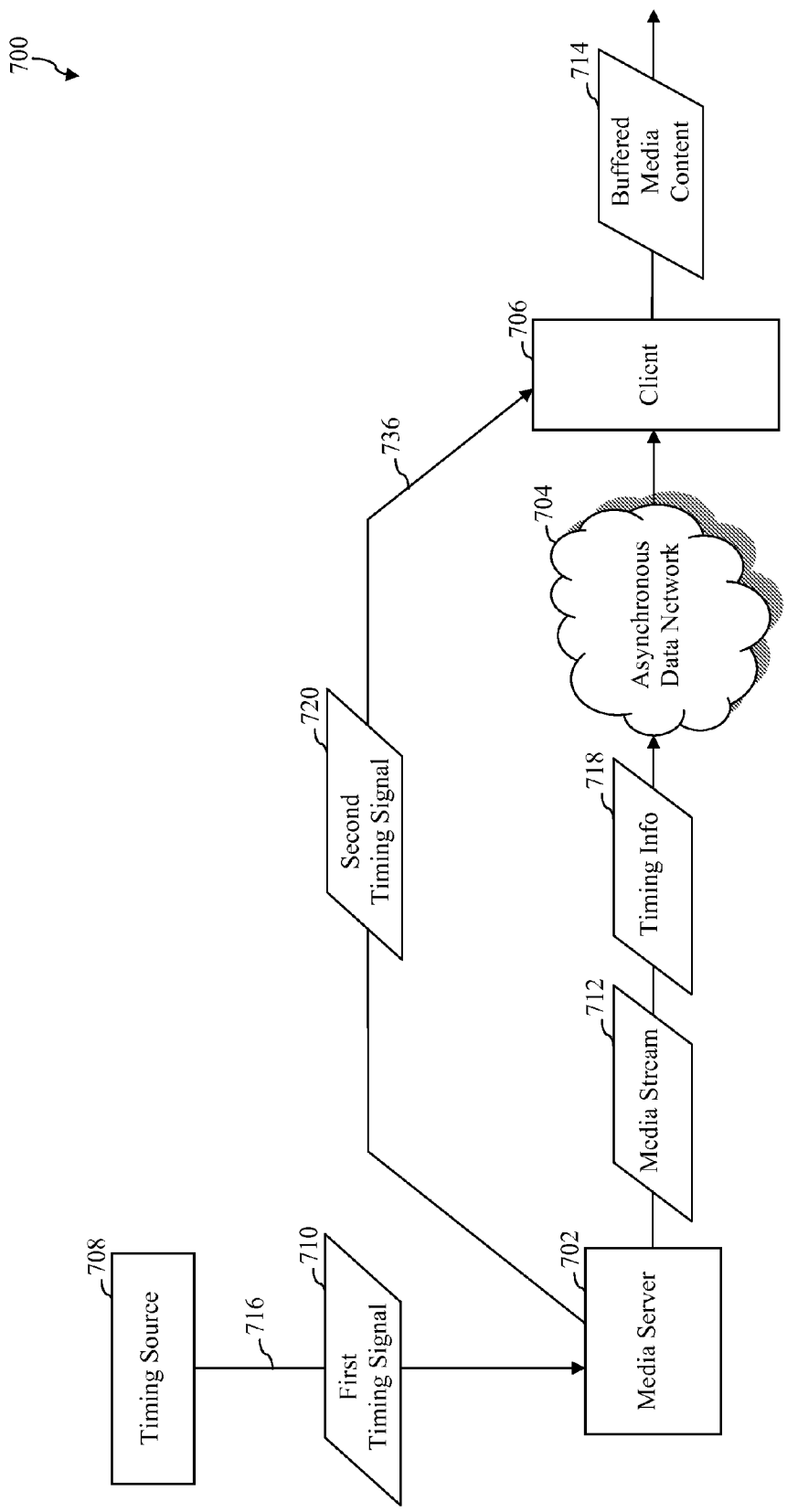

SYNCHRONIZING MEDIA STREAMS USING TIME SIGNAL(S) FROM AN INDEPENDENT TIME SOURCE

CROSS-REFERENCE TO RELATED APPLICATIONS

This application claims the benefit of U.S. Provisional Application No. 61/434,257, filed Jan. 19, 2011, the entirety of which is incorporated by reference herein.

BACKGROUND OF THE INVENTION

1. Field of the Invention

The invention generally relates to synchronization of media streams.

2. Background

Multiple media streams can be combined to provide combined media (e.g., multimedia) content for consumption by a user. It is desirable for such media streams to be synchronized in order to provide the intended combined media experience for the user. However, synchronization in some environments, such as an asynchronous networked environment, poses challenges. For example, in an internet protocol (IP) networked environment, a sending device traditionally includes timing information in each packet (i.e., encapsulated portion) of a media stream so that a receiving device may organize the packets in a designated order and play back the packets at a designated rate, as specified by the timing information. The timing information from the packets of each media stream is correlated and applied to the combined media content before the content is played back or presented to the user.

Correlation of timing information across media streams requires that such timing information be of the same time origin. Such time origin traditionally is a network time server in a network. For instance, IP endpoints of an IP network typically retrieve time information from the network time server using a protocol such as Network Time Protocol (NTP). However, the retrieved timing information often has accuracy in the order of hundreds of milliseconds (~200 ms) due to network latency and other factors. As a result, the timestamp values that are applied to the media stream packets inherit a few hundred milliseconds of time uncertainties.

Due to the inherit time uncertainty regarding each stream over the network, the overall uncertainty increases as the number of streams increases. This uncertainty has a direct effect on the accuracy of cross correlation that is needed for the synchronization of the combined media content and therefore the impact on the combined media experience of the user.

BRIEF SUMMARY OF THE INVENTION

A system and/or method for synchronizing media streams using time signal(s) from an independent time source, substantially as shown in and/or described in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIGS. 1, 2, 7, 9, 12, and 14 depict example media systems in accordance with embodiments described herein.

FIG. 5 is a block diagram of an example implementation of a client shown in

Figure 2:
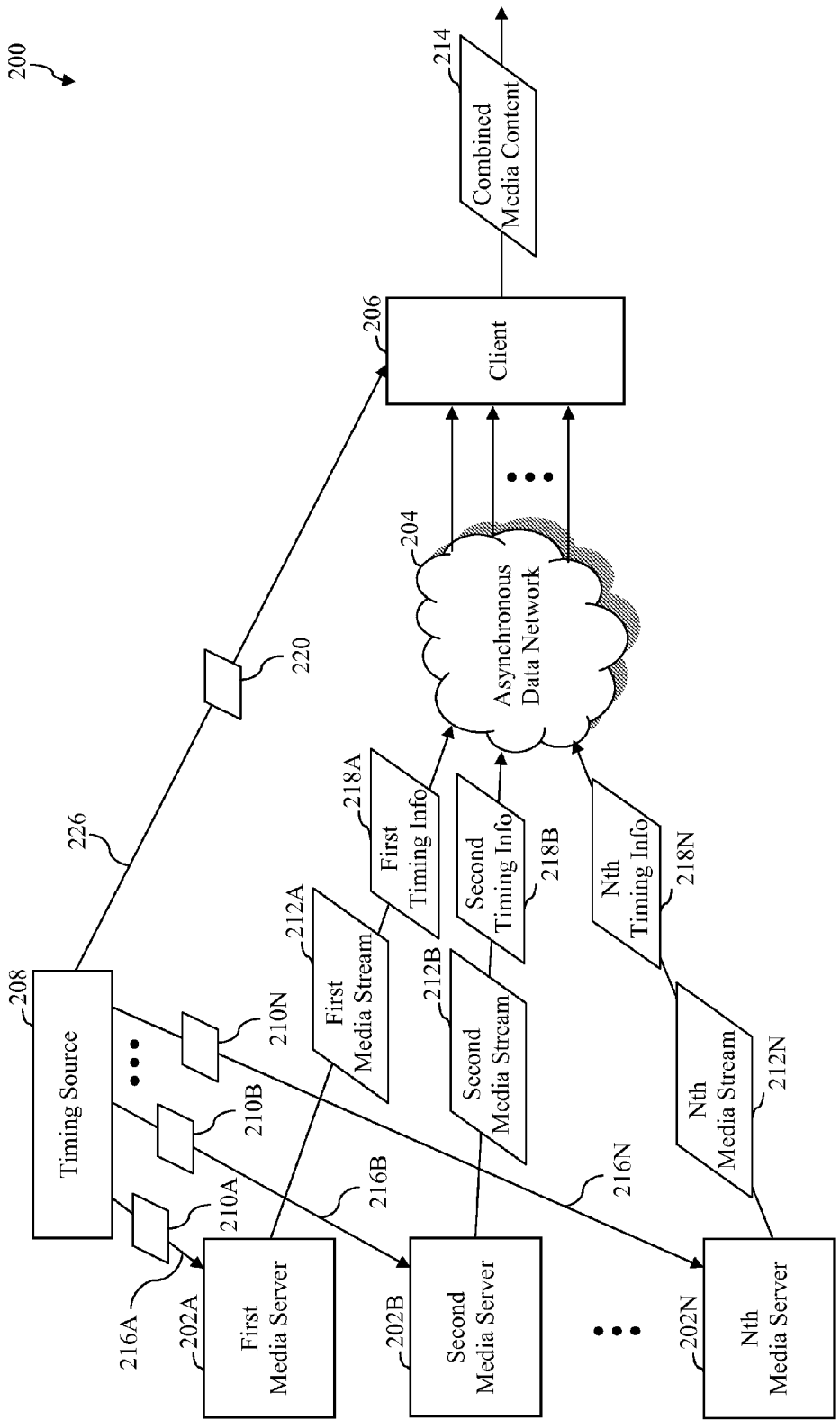

FIG. 2 in accordance with an embodiment described herein.

FIGS. 6, 8, 10, and 13 depict flowcharts of example methods for buffering a media stream in accordance with embodiments described herein.

Figure 9:
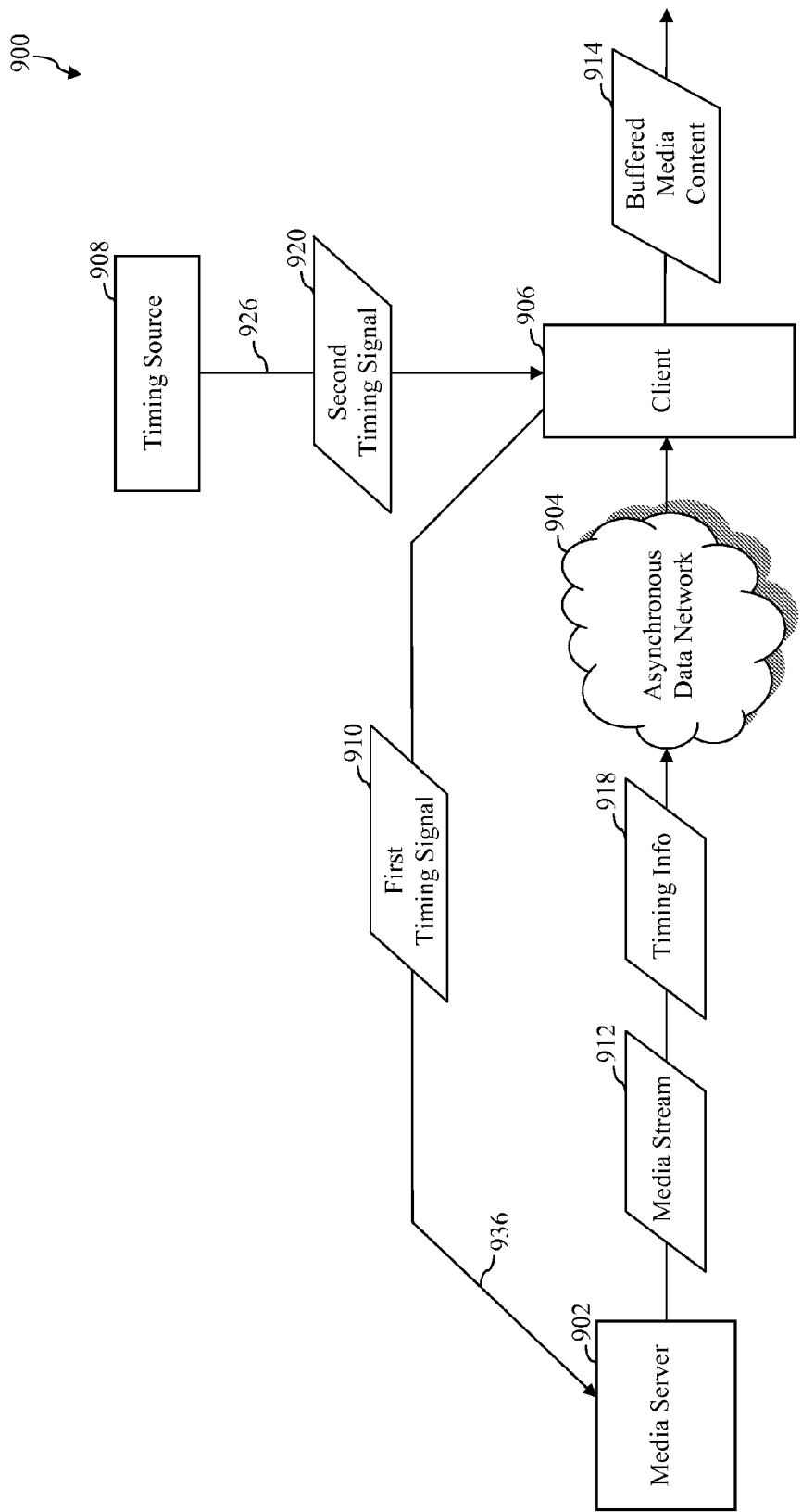
Figure 11:
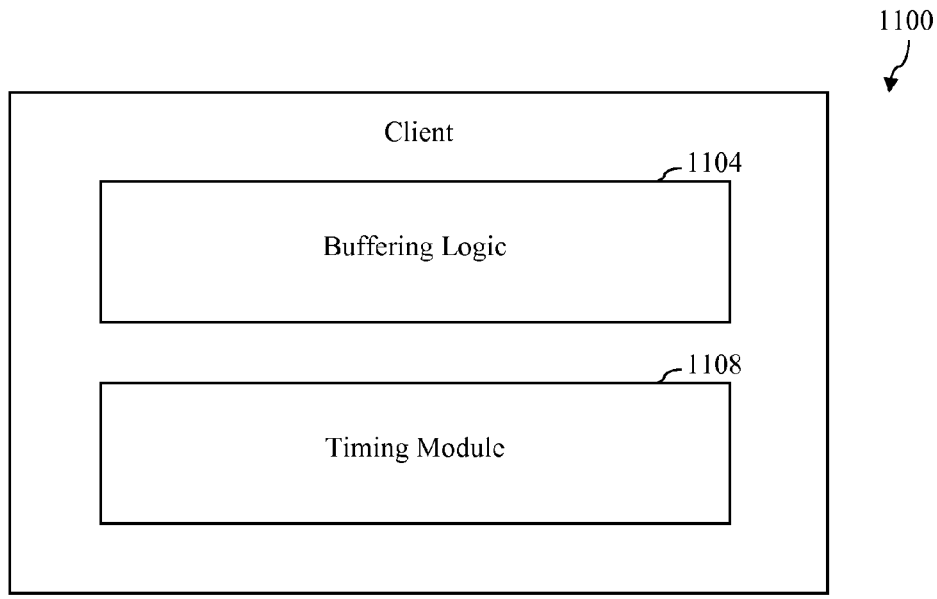

FIG. 11 is a block diagram of an example implementation of a client shown in FIG. 9 in accordance with an embodiment described herein.

Figure 15:
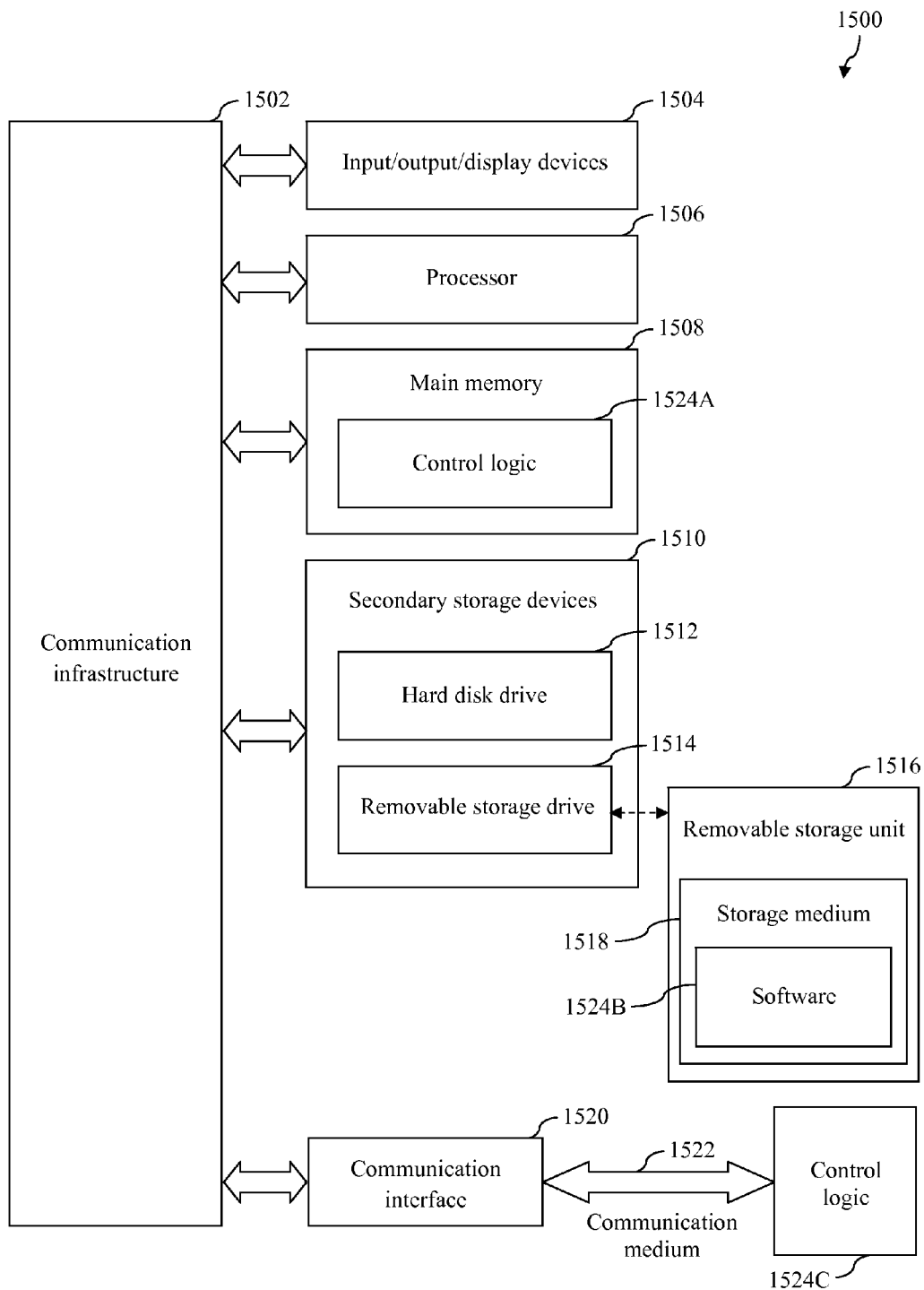

FIG. 15 is a block diagram of a computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

The following detailed description refers to the accompanying drawings that illustrate example embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Various approaches are described herein for, among other things, synchronizing media streams using time signal(s) from an independent time source. An independent time source is a time source that is independent from (i.e., that is not connected to) an asynchronous data network via which the media streams are transferred. Such an asynchronous data network may be a single asynchronous data network, may include multiple asynchronous data networks, or may include one or more asynchronous data networks and one or more synchronous data networks. The independent time source may be a local entity, such as a wireless network clock source, or a global entity, such as an atomic clock.

In accordance with the approaches described herein, the media streams are transferred from media server(s) to client(s) via an asynchronous data network. A client may be a media player, a media aggregation server, or any other suitable type of client. A media aggregation server combines media streams from multiple media servers, so that the combined media streams may be provided to a media player for consumption by a user. The independent time source provides the time signal(s) to the media server(s) and/or the client(s) to facilitate synchronization of the media streams. The time signal(s) may be digital time signal(s), analog time signal(s), or a combination thereof.

In accordance with a first approach, a first media stream that is generated by a first media source is received from a first media server via an asynchronous data network. First timing information, which is based on a first timing signal received from a timing source that is not connected to the asynchronous data network, is received from the first media server. The first timing information may be received via the asynchronous data network or via a path that does not include the asynchronous network. A second media stream that is generated by a second media source is received from a second media server that is different from the first media server via the asynchronous data network. Second timing information, which is based on a second timing signal received from the timing source that is not connected to the asynchronous data network, is received from the second media server. The second timing information may be received via the asynchronous data network or via a path that does not include the asynchronous network. The first media stream and the second media stream are synchronized based on the first timing information and the second timing information to provide combined media (e.g., multimedia) content that is based on the first and second media streams.

In accordance with a second approach, a media stream is received from a media server via an asynchronous data network. Timing information, which is generated based on a timing signal received from a timing source that is not connected to the asynchronous data network, is received from the media server. For example, the timing information may be received from the media server via the asynchronous data network. In another example, the timing information may be received from the media server via a path that does not include the asynchronous data network. A second timing signal is received from the timing source that is not connected to the asynchronous data network. The media stream is buffered using the timing information and the second timing signal.

In accordance with a third approach, a media stream and timing information regarding the media stream are received from a media server via an asynchronous data network. The timing information is based on a first timing signal received from a timing source that is not connected to the asynchronous data network. A second timing signal that is based on the first timing signal is received from the media server via a path that does not include the asynchronous data network. The media stream is buffered using the timing information and the second timing signal.

In accordance with a fourth approach, a media stream and timing information regarding the media stream are received from a media server via an asynchronous data network. The timing information is based on a first timing signal. The first timing signal is provided to the media server via a path that does not include the asynchronous data network. The first timing signal is based on a second timing signal. The second timing signal is received from a timing source that is not connected to the asynchronous data network. The media stream is buffered using the timing information and the second timing signal.

In accordance with a fifth approach, a router that is coupled between a media server and a client includes input circuitry, a timing module, and output circuitry. The input circuitry receives a media stream and timing information regarding the media stream from the media server via an asynchronous data network. The timing module provides a timing signal to the client via a path that does not include the asynchronous data network. The output circuitry provides the media stream and the timing information to the client via the asynchronous data network to enable the client to buffer the media stream using the timing information and the timing signal.

In accordance with a sixth approach, a system includes an audio server, a first speaker, and a second speaker. The audio server provides a first audio stream and a second audio stream via an asynchronous data network. The first speaker buffers the first audio stream that is received from the audio server via the asynchronous data network based on a first timing signal that is received from a timing source that is not connected to the asynchronous data network. The second speaker buffers the second audio stream that is received from the audio server via the asynchronous data network based on a second timing signal that is received from the timing source that is not connected to the asynchronous data network.

The synchronization techniques described herein have a variety of benefits as compared to conventional synchronization techniques. For example, the synchronization techniques described herein may synchronize media streams more quickly and/or more accurately than conventional synchronization techniques. The synchronization techniques may be characterized by less playback latency than conventional techniques. For instance, using an independent time source, as described herein, may cause time uncertainties that are associated with the media streams to become negligible.

II. Example Embodiments

Figure 1:
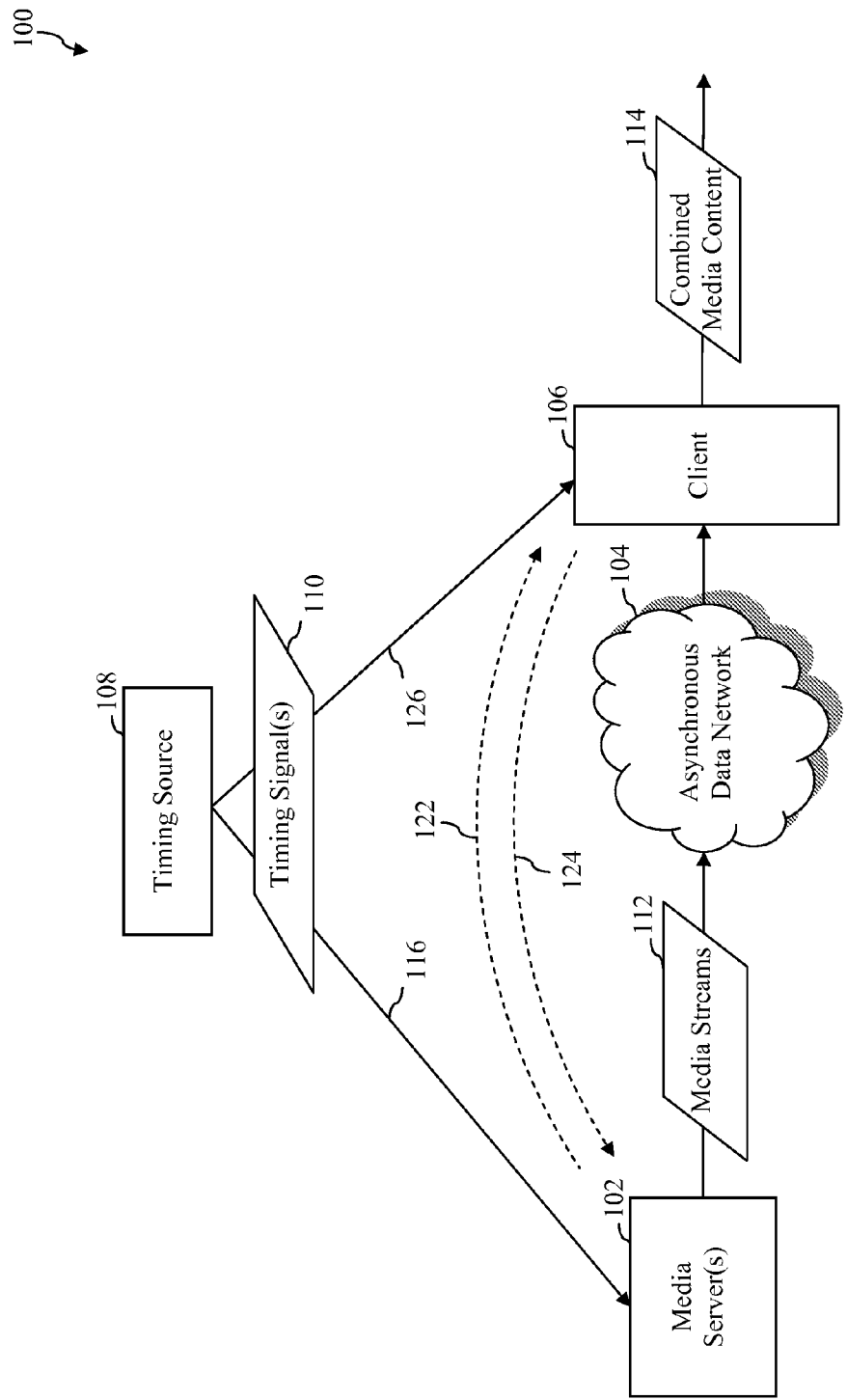

FIG. 1 depicts an example media system 100 in accordance with an embodiment described herein. Generally speaking, media system 100 operates to combine media streams in order to provide combined media (e.g., multimedia) content for consumption by a user. Media system 100 includes media server(s) 102, an asynchronous data network 104, a client 106, and a timing source 108. Communication among media server(s) 102 and client 106 may be carried out via asynchronous data network 104 using well-known network communication protocols. Communication among media server(s) 102 and client 106 may be carried out via a path (e.g., path 122 or 124) that does not include asynchronous data network 104 using well-known wireless (e.g., Bluetooth®, WiFi™, etc.) or wired communication protocols. Asynchronous data network 104 may be a single asynchronous data network, may include multiple asynchronous data networks, or may include one or more asynchronous data networks and one or more synchronous data networks. For instance, asynchronous data network 104 may be a wide-area network (e.g., the Internet), a local area network (LAN), another type of network, or a combination thereof.

Media server(s) 102 are processing systems that are capable of communicating with client 106. An example of a processing system is a system that includes at least one processor that is capable of manipulating data in accordance with a set of instructions. For instance, a processing system may be a computer, a personal digital assistant, etc. Media server(s)

102 provide a plurality of media streams 112 to client 106 via asynchronous data network 104.

Client 106 is a processing system that is capable of processing the media streams 112 that are received from media server(s) 102. Client 106 synchronizes the media streams 112 based on timing signal(s) 110 that are provided by timing source 108. Client 106 combines the media streams 112 to provide combined media content 114.

Timing source 108 is a device that is capable of generating a clock signal independently from asynchronous data network 104. For instance, timing source 108 may be a quartz clock, an atomic clock, or any other suitable type of timing source. Timing source 108 provides the timing signal(s) 110 to media server(s) 102 via path 116 and/or to client 106 via path 126. Neither path 116 nor path 126 includes the asynchronous data network 104.

Timing source 108 may provide the timing signal(s) 110 via any suitable connection(s), such as a Bluetooth® connection, a cellular connection, etc. The connection(s) may be established in accordance with a specified protocol, such as a wireless (e.g., Bluetooth®, cellular, etc.) or wired communication protocol, as indicated above. It will be recognized, however, that the connection(s) need not necessarily be established in accordance with a specified protocol. Bluetooth® is a wireless protocol that uses 2.4 gigahertz (GHz) signals to transmit information between devices. For instance, each of the timing signal(s) 110 may be a 2.4 GHz signal in accordance with the Bluetooth® protocol. A cellular protocol may support one or more sub-bands of the ultra high frequency (UHF) band of the radio frequency spectrum. Some examples of a cellular protocol include but are not limited to code division multiple access (CDMA), time division multiple access (TDMA), global system for mobile communications (GSM®), digital enhanced cordless telecommunications (DECT), worldwide interoperability for microwave access (WiMAX®), total access communication system (TACS), and advanced mobile phone system (AMPS).

In a first example, timing source 108 provides the timing signal(s) 110 to media server(s) 102, but not to client 106. In accordance with this example, media server(s) 102 may provide timing information that is based on the timing signal(s) 110 to client 106 via asynchronous data network 104 and/or via a path 122 that does not include asynchronous data network 104. For instance, media server(s) 102 may insert time stamps that are based on the timing signal(s) 110 in the media streams 112 before providing the media streams 112 to client 106 via asynchronous data network 104. In addition or alternatively, media server(s) 102 may otherwise combine (e.g., prepend or append) timing information that is based on the timing signal(s) 110 with the media streams 112 before providing the media streams 112 to client 106. In addition or alternatively, media server(s) 102 may provide timing information that is based on the timing signal(s) 110 to client 106 separately from the media streams 112 via asynchronous data network 104 and/or via path 122. In accordance with this example, client 106 may use the timing information (e.g., time stamps that are based on the timing signal(s) 110) to synchronize the media streams 112.

In a second example, timing source 108 provides the timing signal(s) 110 to client 106, but not to media server(s) 102. In accordance with this example, client 106 may provide timing information that is based on the timing signal(s) 110 to media server(s) 102 via asynchronous data network 104 and/or via a path 124 that does not include asynchronous data network 104. Upon receipt of the timing information from client 106, media server(s) 102 may insert time stamps that are based on the received timing information in the media streams 112 before providing the media streams 112 to client 106 via asynchronous data network 104. In addition or alternatively, media server(s) 102 may otherwise combine (e.g., prepend or append) second timing information, which is based on the timing information that is received from client 106, with the media streams 112 before providing the media streams 112 to client 106. In addition or alternatively, media server(s) 102 may provide the second timing information to client 106 separately from the media streams 112 via asynchronous data network 104 and/or via path 122. In accordance with this example, client 106 may use the second timing information and the time signal(s) 110 to synchronize the media streams 112.

In a third example, timing source 108 provides the timing signal(s) 110 (or a first subset thereof) to media server(s) 102 and further provides timing signal(s) 110 (or a second subset thereof) to client 106. In accordance with this example, media server(s) 102 may insert time stamps that are based on the timing signal(s) 110 (or the first subset thereof) in the media streams 112 before providing the media streams 112 to client 106 via asynchronous data network 104. In addition or alternatively, media server(s) 102 may otherwise combine (e.g., prepend or append) timing information that is based on the timing signal(s) 110 with the media streams 112 before providing the media streams 112 to client 106. In addition or alternatively, media server(s) 102 may provide the timing information to client 106 separately from the media streams 112 via asynchronous data network 104 and/or via path 122. In accordance with this example, client 106 may use the timing information and the time signal(s) 110 (or the second subset thereof) to synchronize the media streams 112.

FIG. 2 depicts another example media system 200 in accordance with an embodiment described herein. Media system 200 includes a plurality of media servers 202A-202N, an asynchronous data network 204, a client 206, and a timing source 208. Timing source 208 provides timing signals 210A-210N to media servers 202A-202N via respective paths 216A-216N, which do not include asynchronous data network 204. Timing source 208 may provide timing signal 220 to client 206 via path 226, which does not include asynchronous data network 204, though it will be recognized that timing source 208 need not necessarily provide the timing signal 220 to client 206. Timing source 208 may provide the timing signals 210A-210N and/or 220 in accordance with any suitable communication protocol, so long as none of the timing signals 210A-210N and 220 are provided via asynchronous data network 204.

It will be recognized that the timing signals 210A-210N may result from a single transmission from timing source 208. For instance, the single transmission may be received by media servers 202A-202N as respective timing signals 210A-210N via respective paths 216A-216N. A single transmission is mentioned for illustrative purposes. The timing signals 210A-210N may result from any number of transmissions from timing source 208.

Media servers 202A-202N provide respective media streams 212A-212N and respective timing information 218A-218N to client 206 via asynchronous data network 204. For example, first media server 202A provides first media stream 212A and first timing information 218A to client 206 via asynchronous data network 204; second media server 202B provides second media stream 212B and second timing information 218B to client 206 via asynchronous data network 204, and so on. The timing information 218A-218N is based on the respective timing signals 210A-210N. Each of the media streams 212A-212N may be an audio stream, an image stream, or a video stream. An audio stream includes audio information but not visual information. An image stream includes visual information but not audio information. A video stream includes both audio information and visual information.

The media streams 212A-212N may include any suitable audio and/or visual information. For instance, any one or more of the media streams 212A-212N may include one or more closed caption messages; one or more audio, image, and/or video advertisements; a slide show; picture-in-picture data, etc. Such a media stream may be configured to be inserted into another of the media streams 212A-212N.

The timing information 218A-218N may be combined with (e.g., embedded in) the respective media streams 212A-212N or separate from the respective media streams 212A-212N. Media servers 202A-202N may provide the media streams 212A-212N and/or the timing information 218A-218N to client 206 simultaneously, ad-hoc (i.e., without consideration of the other media streams) as the media streams 212A-212N and/or the timing information 218A-218N are received by respective media servers 202A-202N, in accordance with a periodic schedule, or in any other suitable manner. Media servers 202A-202N may provide the media streams 212A-212N and the timing information 218A-218N in accordance with well-known network communication protocols.

It will be recognized that media servers 202A-202N need not necessarily provide timing information 218A-218N via asynchronous data network 204, as depicted in FIG. 2. For instance, media servers 202A-202N may provide timing information 218A-218N via respective paths that do not include asynchronous data network 204.

Client 206 synchronizes the media streams 212A-212N based on the timing information 218A-218N. Client 206 may synchronize the media streams 212A-212N further based on timing signal 220, though the scope of the embodiments is not limited in this respect. Client 206 combines the media streams 212A-212N to provide combined media content 214.

Figure 3:
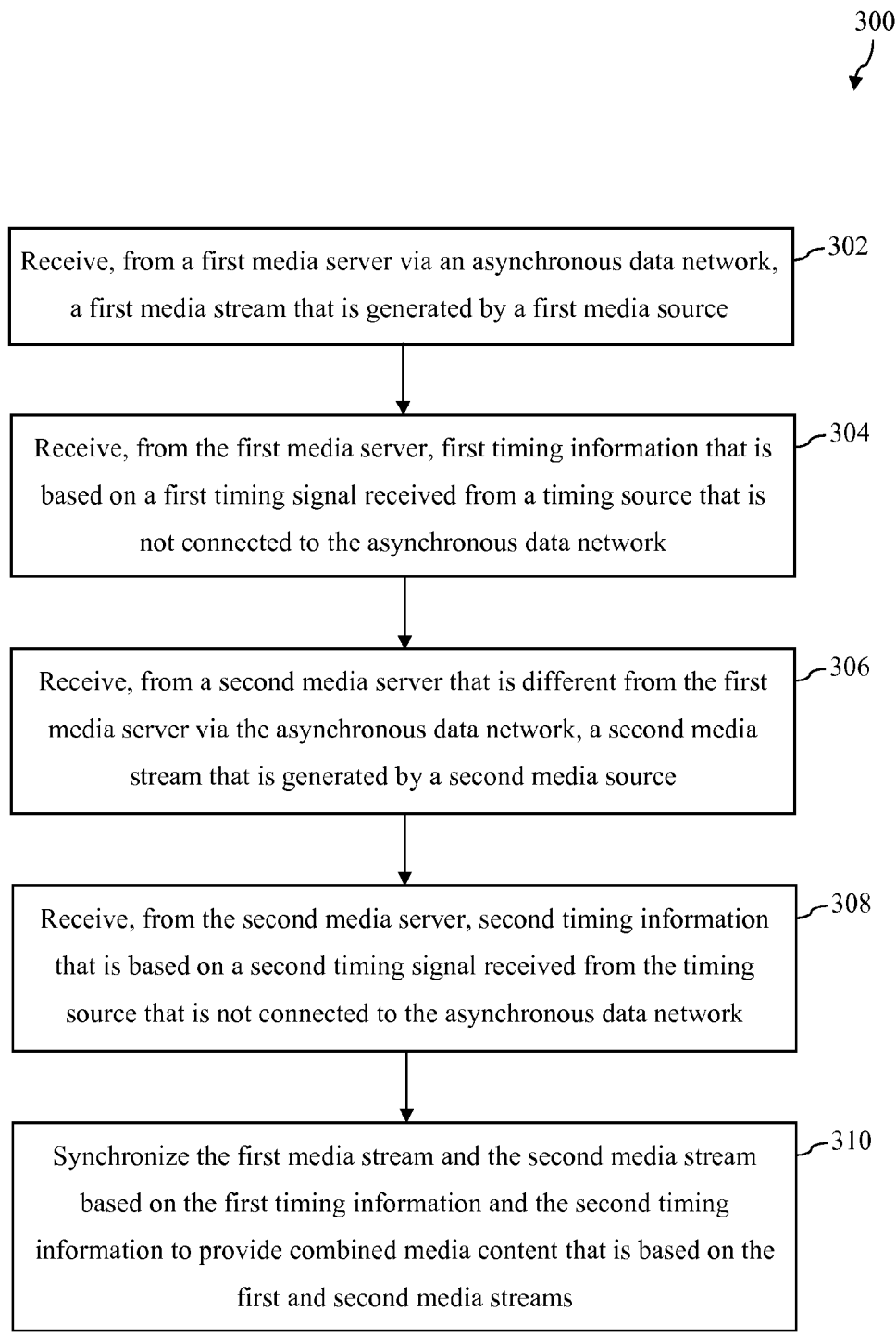
FIGS. 3 and 4 depict flowcharts of example methods for synchronizing media streams in accordance with embodiments described herein.

FIG. 3 depicts a flowchart 300 of an example method for synchronizing media streams in accordance with an embodiment described herein. The method of flowchart 300 will now be described with reference to certain elements of example media system 200 as described above with reference to FIG. 2. However, the method is not limited to that implementation.

As shown in FIG. 3, flowchart 300 starts at step 302. In step 302, a first media stream that is generated by a first media source is received from a first media server via an asynchronous data network. The first media stream may be an audio stream, an image stream, or a video stream. In an example implementation, client 206 receives first media stream 212A, which is generated by a first media source, from first media server 202A via asynchronous data network 204.

In an example video conferencing embodiment, the first media stream includes first visual data and first audio data. The first visual data represents a visual depiction of a first participant of a video conference. The first audio data represents speech of the first participant.

At step 304, first timing information that is based on a first timing signal received from a timing source that is not connected to the asynchronous data network is received from the first media server. For example, the first timing information may be received from the first media server via the asynchronous data network. In another example, the first timing information may be received from the first media server via a path that does not include the asynchronous data network. In an example implementation, client 206 receives first timing information 218A, which is based on first timing signal 210A received from timing source 208, from first media server 202A.

At step 306, a second media stream that is generated by a second media source is received from a second media server that is different from the first media server via the asynchronous data network. The second media stream may be an audio stream, an image stream, or a video stream. In an example implementation, client 206 receives second media stream 212B, which is generated by a second media source, from second media server 202B via asynchronous data network 204.

In accordance with the example video conferencing embodiment mentioned above, the second media stream includes second visual data and second audio data. The second visual data represents a visual depiction of a second participant of the video conference. The second audio data represents speech of the second participant.

At step 308, second timing information that is based on a second timing signal received from the timing source that is not connected to the asynchronous data network is received from the second media server. For example, the second timing information may be received from the second media server via the asynchronous data network. In another example, the second timing information may be received from the second media server via a path that does not include the asynchronous data network. In an example implementation, client 206 receives second timing information 218B, which is based on second timing signal 210B received from timing source 208, from second media server 202B.

At step 310, the first media stream and the second media stream are synchronized based on the first timing information and the second timing information to provide combined media content that is based on the first and second media streams. In an example implementation, client 206 synchronizes the first media stream 212A and the second media stream 212B based on the first timing information 218A and the second timing information 218B to provide combined media content 214 that is based on the first and second media streams 212A and 212B.

In accordance with the example video conferencing embodiment mentioned above, the first visual data, the first audio data, the second visual data, and the second audio data are synchronized based on the first timing information and the second timing information to provide multimedia content that includes the visual depiction of the first participant, the speech of the first participant, the visual depiction of the second participant, and the speech of the second participant in synchrony. For instance, synchronization of the various data mentioned above may result in lip-sync between the visual depiction and the speech of the first participant, lip-sync between the visual depiction and the speech of the second participant, synchronization between the visual depiction of the first participant and the visual depiction of the second participant, and/or synchronization between the speech of the first participant and the speech of the second participant.

Figure 4:
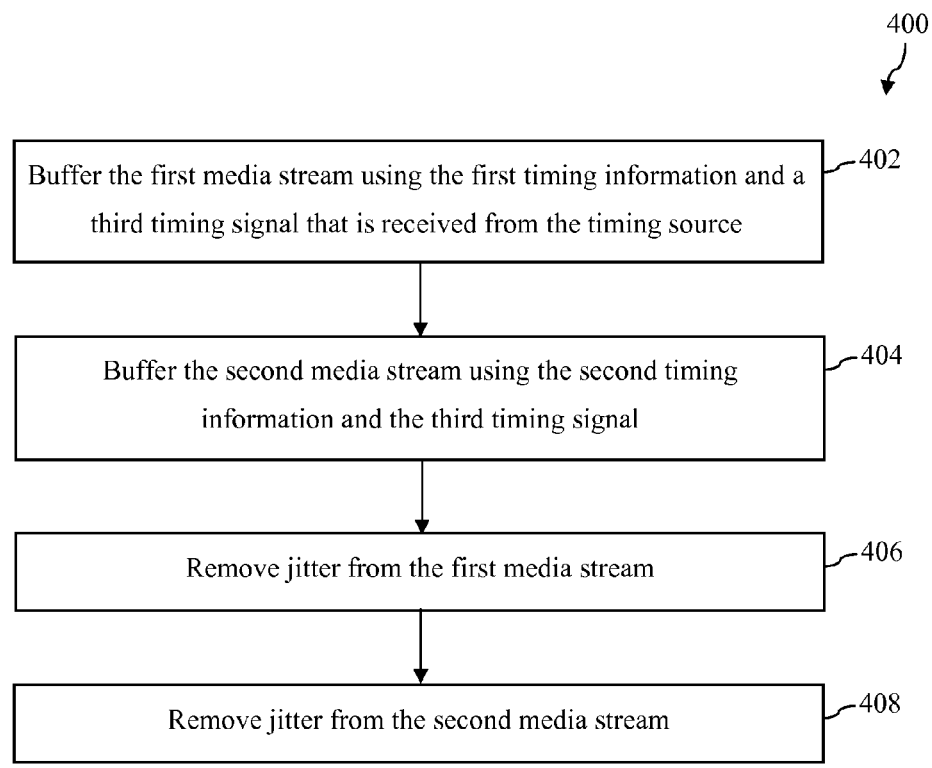
Figure 5:
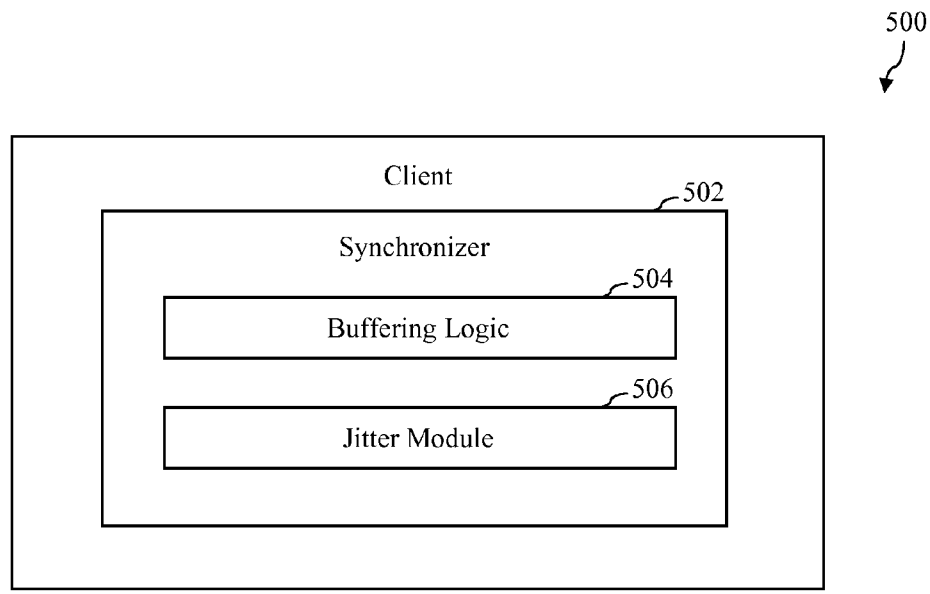

FIG. 4 depicts a flowchart 400 of an example implementation of step 310 of FIG. 3 in accordance with an embodiment described herein. Flowchart 400 may be performed by client 206 of media system 200 shown in FIG. 2, for example. For illustrative purposes, flowchart 400 is described with respect to a client 500 shown in FIG. 5, which is an example of client 206, according to an embodiment. As shown in FIG. 5, client 500 includes a synchronizer 502. Synchronizer 502 is configured to synchronize media streams. Synchronizer 502 includes buffering logic 504 and a jitter module 506. Further structural and operational embodiments will be apparent to persons skilled in the relevant art(s) based on the discussion regarding flowchart 400.

As shown in FIG. 4, the method of flowchart 400 begins at step 402. In step 402, the first media stream is buffered using the first timing information and a third timing signal that is received from the timing source. For example, the first media stream may be buffered to compensate for variation in a rate and/or timing with which various portions of the first media stream are received at step 302 of FIG. 3. In another example, the first media stream may be buffered to compensate for a difference between rates and/or timing with which the first media stream is received at step 302 and the second media stream is received at step 306 of FIG. 3. In an example implementation, buffering logic 504 buffers the first media stream 212A using the first timing information 218A and timing signal 220, which is received from timing source 208.

At step 404, the second media stream is buffered using the second timing information and the third timing signal. For example, the second media stream may be buffered to compensate for variation in a rate and/or timing with which various portions of the second media stream are received at step 306 of FIG. 3. In another example, the second media stream may be buffered to compensate for a difference between rates and/or timing with which the first media stream is received at step 302 and the second media stream is received at step 306 of FIG. 3. In an example implementation, client 206 buffers the second media stream 212B using the second timing information 218B and timing signal 220.

At step 406, jitter is removed from the first media stream. In an example implementation, jitter module 506 removes jitter from the first media stream 212A.

At step 408, jitter is removed from the second media stream. In an example implementation, jitter module 506 removes jitter from the second media stream 212B.

Figure 6:
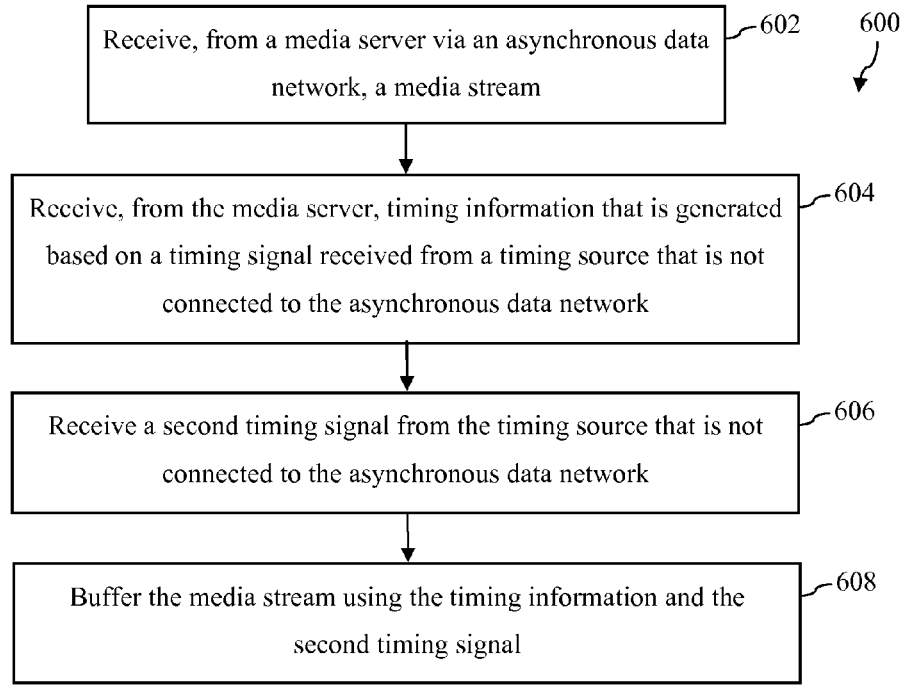

FIG. 6 depicts a flowchart 600 of an example method for buffering a media stream in accordance with embodiments described herein. The method of flowchart 600 will now be described with reference to example client 500 as described above with reference to FIG. 5. However, the method is not limited to that implementation.

As shown in FIG. 6, flowchart 600 starts at step 602. In step 602, a media stream is received from a media server via an asynchronous data network. In an example implementation, buffering logic 504 receives first media stream 212A from first media server 202A via asynchronous data network 204.

At step 604, timing information that is generated based on a timing signal received from a timing source that is not connected to the asynchronous data network is received from the media server. For example, the timing information may be received from the media server via the asynchronous data network. In another example, the timing information may be received from the media server via a path that does not include the asynchronous data network. The timing source may be a quartz clock, an atomic clock, or any other suitable type of timing source. The timing information may be generated based on the timing signal received from the timing source via any suitable connection, such as a Bluetooth® connection, a cellular connection, etc. In an example implementation, buffering logic 504 receives first timing information 218A, which is generated based on first timing signal 210A received from timing source 208, from first media server 202A.

At step 606, a second timing signal is received from the timing source that is not connected to the asynchronous data network. In an example implementation, buffering logic 504 receives timing signal 220 from timing source 208.

At step 608, the media stream is buffered using the timing information and the second timing signal. In an example implementation, buffering logic 504 buffers the first media stream 212A using the first timing information 218A and the timing signal 220.

FIG. 7 depicts another example media system 700 in accordance with an embodiment described herein. Media system 700 includes a media server 702, an asynchronous data network 704, a client 706, and a timing source 708. Timing source 708 provides a first timing signal 710 to media server 702 via a path 716 that does not include asynchronous data network 704. Media server 702 provides media stream 712 and timing information 718 to client 706 via asynchronous data network 704. The timing information 718 is based on the first timing signal 710. Media server 702 further provides a second timing signal 720 to client 706 via a path 736 that does not include asynchronous data network 704. The second timing signal 720 is based on the first timing signal 710. For instance, the second timing signal 720 may be the same as the first timing signal 710. Client 706 synchronizes the media stream 712 based on the timing information 718 and the second timing signal 720 to provide buffered media content 714.

Figure 8:
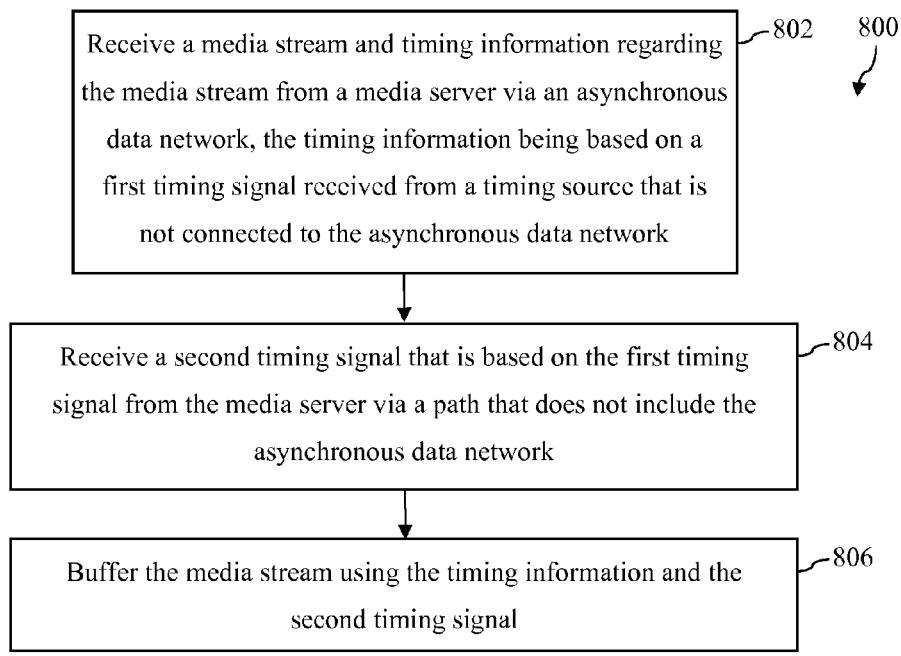

FIG. 8 depicts a flowchart 800 of another example method for buffering a media stream in accordance with embodiments described herein. The method of flowchart 800 will now be described with reference to example client 500 as described above with reference to FIG. 5. However, the method is not limited to that implementation.

As shown in FIG. 8, flowchart 800 starts at step 802. In step 802, a media stream and timing information regarding the media stream are received from a media server via an asynchronous data network. The timing information is based on a first timing signal received from a timing source that is not connected to the asynchronous data network. The timing source may be a quartz clock, an atomic clock, or any other suitable type of timing source. The timing information may be based on the first timing signal received from the timing source via any suitable connection, such as a Bluetooth® connection, a cellular connection, etc. In an example implementation, buffering logic 504 receives media stream 712 and timing information 718 from media server 702 via asynchronous data network 704. Timing information 718 is based on first timing signal 710 received from timing source 708, which is not connected to asynchronous data network 704.

At step 804, a second timing signal that is based on the first timing signal is received from the media server via a path that does not include the asynchronous data network. The second timing signal may be received from the media server in accordance with a protocol, such as a Bluetooth® protocol, a cellular protocol, etc., though the scope of the embodiments is not limited in this respect. In an example implementation, buffering logic 504 receives second timing signal 720, which is based on the first timing signal 710, from media server 702 via a path 736 that does not include asynchronous data network 704.

At step 806, the media stream is buffered using the timing information and the second timing signal. In an example implementation, buffering logic 504 buffers the media stream 712 using the timing information 718 and the second timing signal 720.

FIG. 9 depicts another example media system 900 in accordance with an embodiment described herein. Media system 900 includes a media server 902, an asynchronous data network 904, a client 906, and a timing source 908. Media server 902 provides a media stream 912 and timing information 918 to client 906 via asynchronous data network 904. The timing information 918 is based on a first timing signal 910 that is received from client 906. Timing source 908 provides a second timing signal 920 to client 906 via a path 926 that does not include asynchronous data network 904. Client 906 provides the first timing signal 910 to media server 902 via a path 936 that does not include asynchronous data network 904. The first timing signal 910 is based on the second timing signal 920. For instance, the first timing signal 910 may be the same as the second timing signal 920. Client 906 synchronizes the media stream 912 based on the timing information 918 and the second timing signal 920 to provide buffered media content 914.

Figure 10:
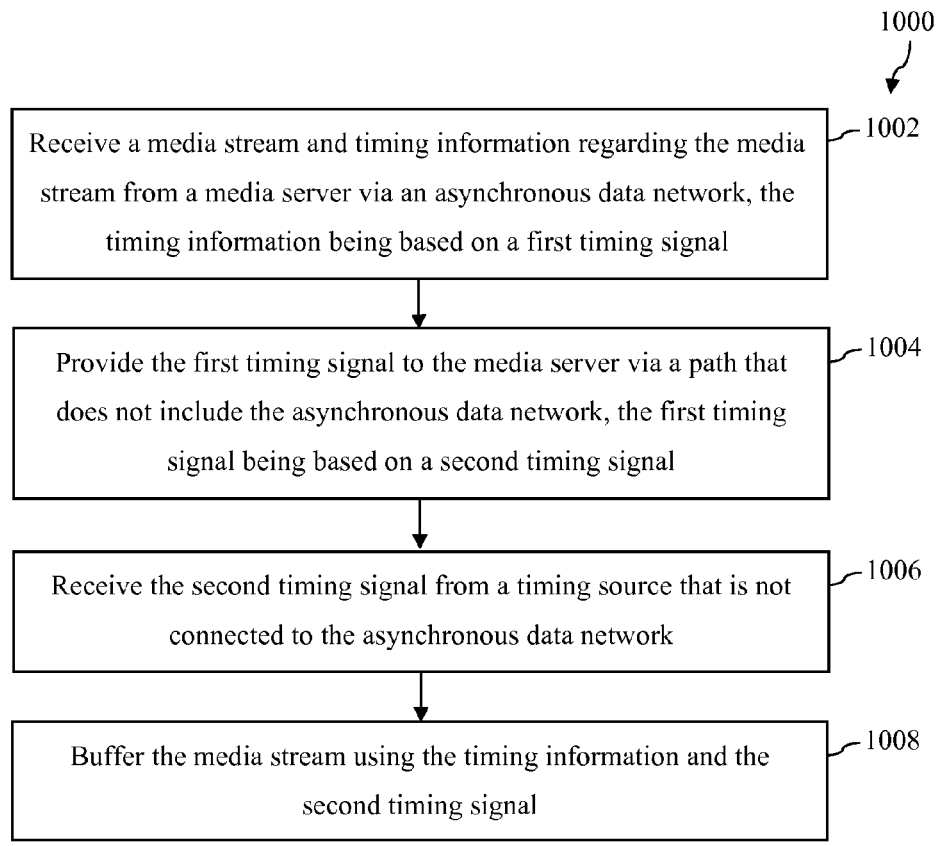

FIG. 10 depicts a flowchart 1000 of another example method for buffering a media stream in accordance with an embodiment described herein. Flowchart 1000 may be performed by client 906 of media system 900 shown in FIG. 9, for example. For illustrative purposes, flowchart 1000 is described with respect to a client 1100 shown in FIG. 11, which is an example of client 906, according to an embodiment. As shown in FIG. 11, client 1100 includes buffering logic 1104 and a timing module 1108. Further structural and operational embodiments will be apparent to persons skilled in the relevant art(s) based on the discussion regarding flowchart 1000.

As shown in FIG. 10, the method of flowchart 1000 begins at step 1002. In step 1002, a media stream and timing information regarding the media stream are received from a media server via an asynchronous data network. The timing information is based on a first timing signal. In an example implementation, buffering logic 1104 receives media stream 912 and timing information 918 from media server 902 via asynchronous data network 904. The timing information 918 is based on first timing signal 910.

At step 1004, the first timing signal is provided to the media server via a path that does not include the asynchronous data network. The first timing signal is based on a second timing signal. The first timing signal may be provided to the media server in accordance with a protocol, such as a Bluetooth® protocol, a cellular protocol, etc., though the scope of the embodiments is not limited in this respect. In an example implementation, timing module 1108 provides first timing signal 910 to media server 902 via a path 936 that does not include asynchronous data network 904. The first timing signal 910 is based on a second timing signal 920.

At step 1006, the second timing signal is received from a timing source that is not connected to the asynchronous data network. The timing source may be a quartz clock, an atomic clock, or any other suitable type of timing source. The second timing signal may be received from the timing source via any suitable connection, such as a Bluetooth® connection, a cellular connection, etc. In an example implementation, buffering logic 1104 receives the second timing signal 920 from timing source 908, which is not connected to asynchronous data network 904.

At step 1008, the media stream is buffered using the timing information and the second timing signal. In an example implementation, buffering logic 1104 buffers the media stream 912 using the timing information 918 and the second timing signal 920.

Figure 12:
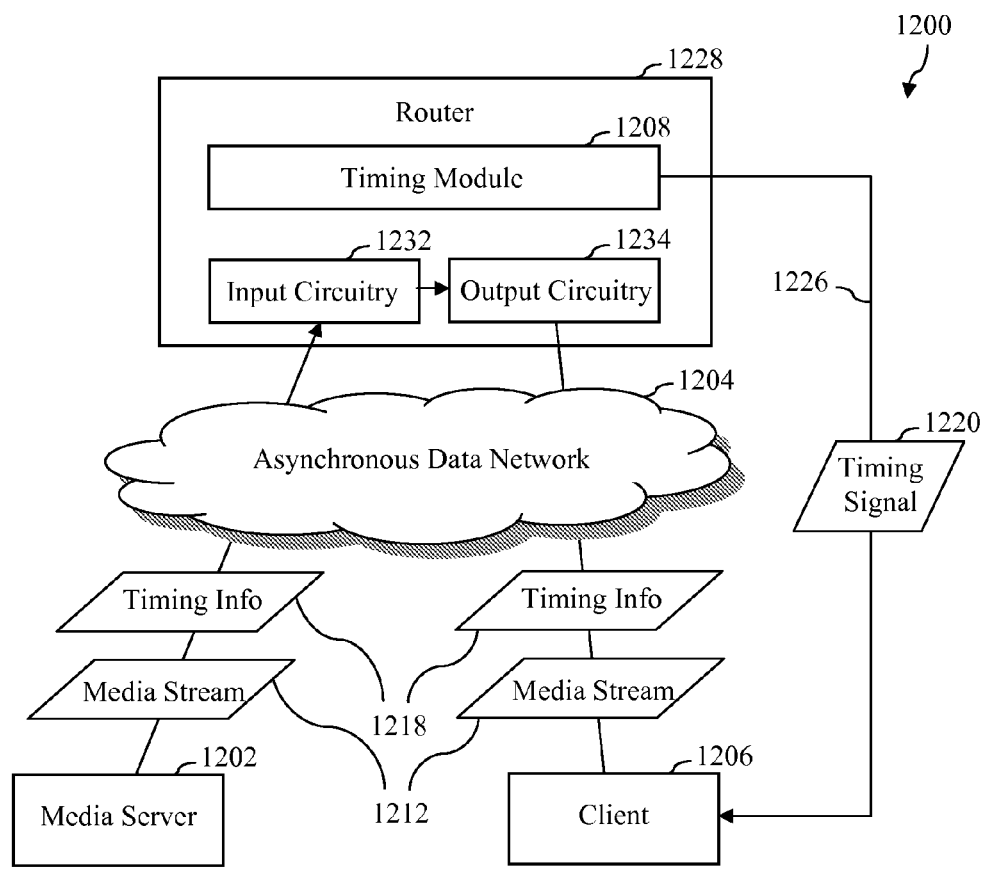

FIG. 12 depicts another example media system 1200 in accordance with an embodiment described herein. Media system 1200 includes a media server 1202, an asynchronous data network 1204, a client 1206, and a router 1228. Media sever 1202 provides a media stream 1212 and timing information 1218 to router 1228 via asynchronous data network 1204.

Router 1228 includes timing module 1208, input circuitry 1232, and output circuitry 1234. Timing module 1208 provides a timing signal 1220 to client 1206 via a path 1226 that does not include asynchronous data network 1204. Input circuitry 1232 receives the media stream 1212 and the timing information 1218 from media server 1202 via asynchronous data network 1204. Input circuitry 1232 forwards the media stream 1212 and the timing information 1218 to output circuitry 1234. Output circuitry 1234 provides the media stream 1212 and the timing information 1218 to client 1206 via asynchronous data network 1204.

Asynchronous data network 1204 may be a single asynchronous data network, may include multiple asynchronous data networks, or may include one or more asynchronous data networks and one or more synchronous data networks. For instance, input circuitry 1232 may receive the media stream 1212 and the timing information 1218 from media server 1202 via a first sub-network of asynchronous data network 1204, and output circuitry 1234 may provide the media stream 1212 and the timing information 1218 to client 1206 via a second sub-network of asynchronous data network 1204. The first sub-network may include one or more asynchronous data networks. The first sub-network may further include one or more synchronous data networks, though the scope of the embodiments is not limited in this respect. The second sub-network may include one or more asynchronous data networks. The second sub-network may further include one or more synchronous data networks, though the scope of the embodiments is not limited in this respect. In one example, the first sub-network is a wide area network (WAN), and the second sub-network is a local area network (LAN). In another example, the first sub-network is a LAN, and the second sub-network is a WAN. In yet another example, the first and second sub-networks are different sub-networks of a common LAN or of a common WAN.

Client 1206 buffers the media stream 1212 based on the timing information 1218 and the timing signal 1220.

Figure 13:
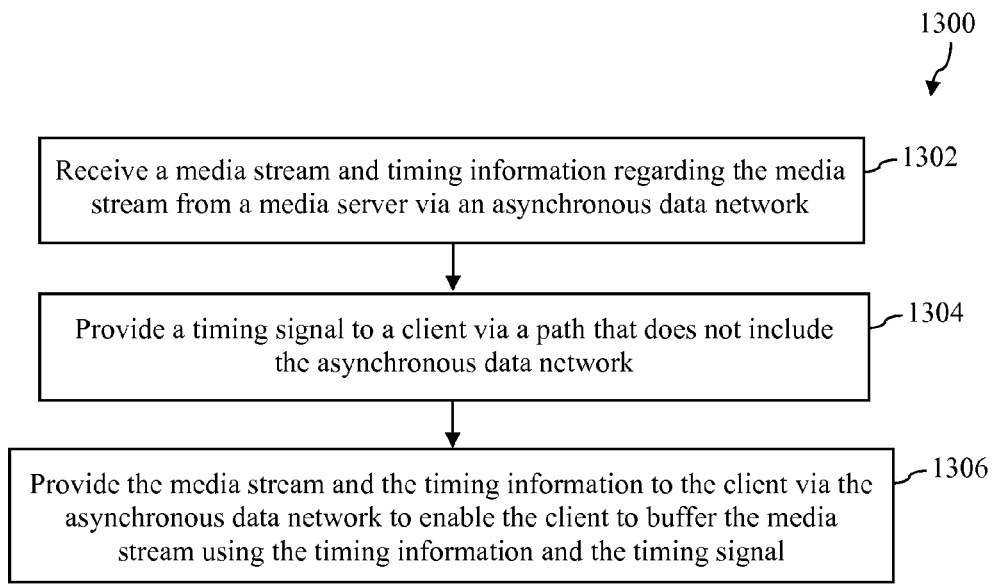

FIG. 13 depicts a flowchart 1300 of another example method for buffering a media stream in accordance with an embodiment described herein. The method of flowchart 1300 will now be described with reference to certain elements of example media system 1200 as described above with reference to FIG. 12. However, the method is not limited to that implementation.

As shown in FIG. 13, flowchart 1300 starts at step 1302. In step 1302, a media stream and timing information regarding the media stream are received from a media server via an asynchronous data network. In an example implementation, input circuitry 1232 receives media stream 1212 and timing information 1218 from media server 1202 via asynchronous data network 1204.

At step 1304, a timing signal is provided to a client via a path that does not include the asynchronous data network. The timing signal may be provided to the client in accordance with a protocol, such as a Bluetooth® protocol, a cellular protocol, etc., though the scope of the embodiments is not limited in this respect. In an example implementation, timing module 1208 provides timing signal 1220 to client 1206 via path 1226, which does not include asynchronous data network 1204.

At step 1306, the media stream and the timing information are provided to the client via the asynchronous data network to enable the client to buffer the media stream using the timing information and the timing signal. In an example implementation, media stream 1212 and timing information 1218 are provided to client 1206 via asynchronous data network 1204 to enable client 1206 to buffer the media stream 1212 using the timing information 1218 and the timing signal 1220.

Figure 14:
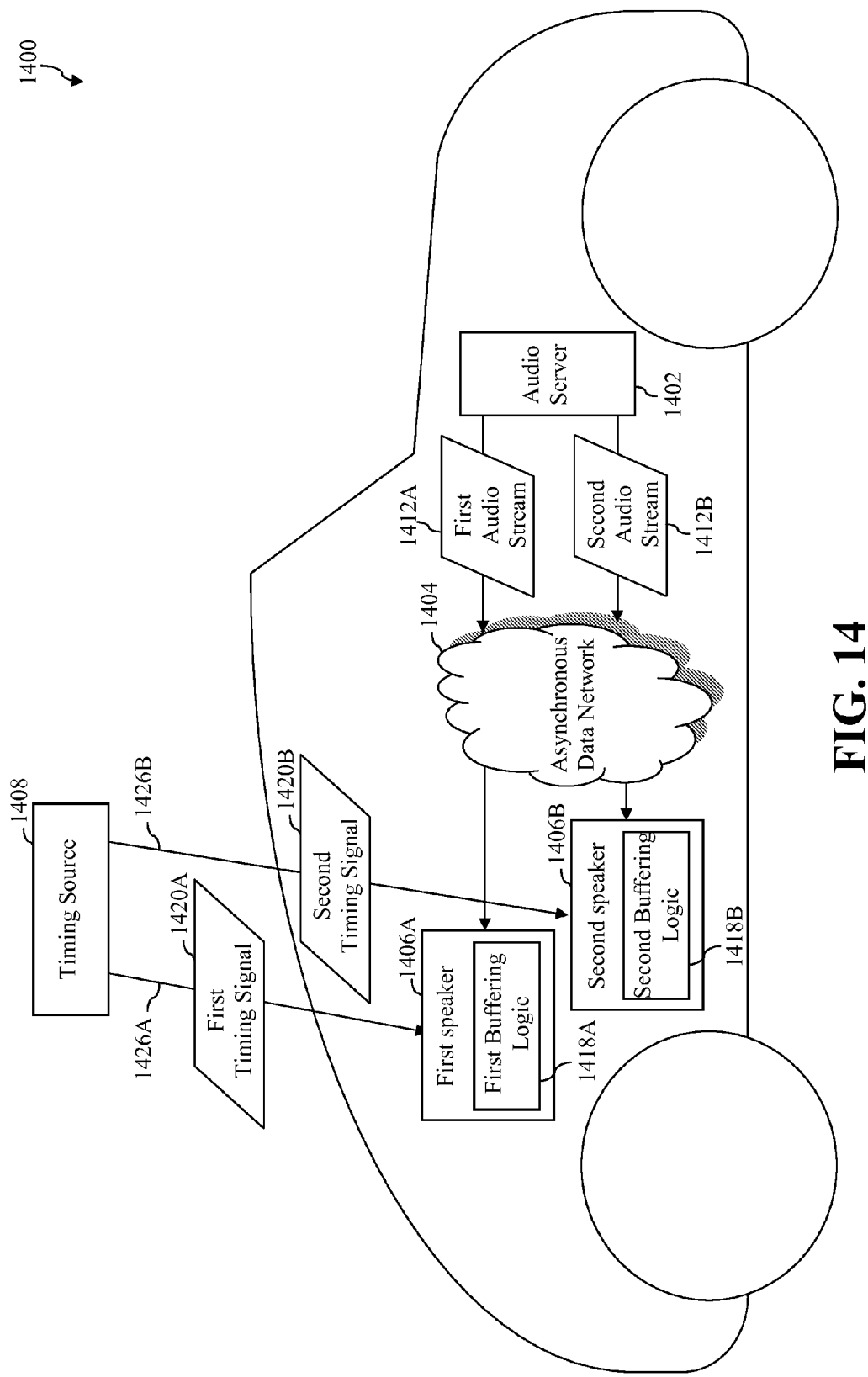

FIG. 14 depicts an example media system 1400 in accordance with an embodiment described herein. Media system 1400 includes an audio server 1402, an asynchronous data network 1404, a first speaker 1406A, a second speaker 1406B, and a timing source 1408. Audio server 1402 provides a first audio stream 1412A to first speaker 1406A via asynchronous data network 1404. Audio server 1402 provides a second audio stream 1412B to second speaker 1406B via asynchronous data network 1404.

Timing source 1408 provides a first timing signal 1420A to first speaker 1406A via a path 1426A that does not include asynchronous data network 1404. Timing source 1408 provides a second timing signal 1420B to second speaker 1406B via a path 1426B that does not include asynchronous data network 1404. Timing source 1408 may be a quartz clock, an atomic clock, or any other suitable type of timing source. Timing source 1408 may provide the first timing signal 1420A to first speaker 1406A and/or the second timing signal 1420B to second speaker 1406B in accordance with a protocol, such as a Bluetooth® protocol, a cellular protocol, etc., though the scope of the embodiments is not limited in this respect.

First speaker 1406A includes first buffering logic 1418A. First buffering logic 1418A buffers the first audio stream 1412A, which is received from audio server 1402 via asynchronous data network 1404, based on the first timing signal 1420A. Second speaker includes second buffering logic 1418B. Second buffering logic 1418B buffers the second audio stream 1412B, which is received from audio server 1402 via asynchronous data network 1404, based on the second timing signal 1420B.

It will be recognized that media server(s) 102, client 106, and timing source 108 depicted in FIG. 1; media servers 202A-202N, client 206, and timing source 208 depicted in FIG. 2; synchronizer 502, buffering logic 504, and jitter module 506 depicted in FIG. 5; media server 702, client 706, and timing source 708 depicted in FIG. 7; media server 902, client 906, and timing source 908 depicted in FIG. 9; buffering logic 1104 and timing module 1108 depicted in FIG. 11; media server 1202, router 1228, timing module 1208, and client 1206 depicted in FIG. 12; and audio server 1402, first buffering logic 1418A, second buffering logic 1418B, and timing source 1408 depicted in FIG. 14 may be implemented in hardware, software, firmware, or any combination thereof.

For example, any of media server(s) 102, client 106, timing source 108, media servers 202A-202N, client 206, timing source 208, synchronizer 502, buffering logic 504, jitter module 506, media server 702, client 706, timing source 708, media server 902, client 906, timing source 908, buffering logic 1104, timing module 1108, media server 1202, router 1228, client 1206, audio server 1402, first buffering logic 1418A, second buffering logic 1418B, and/or timing source 1408 may be implemented as computer program code configured to be executed in one or more processors.

In another example, any of media server(s) 102, client 106, timing source 108, media servers 202A-202N, client 206, timing source 208, synchronizer 502, buffering logic 504, jitter module 506, media server 702, client 706, timing source 708, media server 902, client 906, timing source 908, buffering logic 1104, timing module 1108, media server 1202, router 1228, timing module 1208, client 1206, audio server 1402, first buffering logic 1418A, second buffering logic 1418B, and/or timing source 1408 may be implemented as hardware logic/electrical circuitry.

FIG. 15 is a block diagram of a computer 1500 in which embodiments may be implemented. For instance, any of media server(s) 102, client 106, and/or timing source 108 depicted in FIG. 1; any of media servers 202A-202N, client 206, and/or timing source 208 depicted in FIG. 2; client 500 depicted in FIG. 5; media server 702, client 706, and/or timing source 708 depicted in FIG. 7; media server 902, client 906, and/or timing source 908 depicted in FIG. 9; client 1100 depicted in FIG. 11; media server 1202, client 1206, and/or router 1228 depicted in FIG. 12; and/or audio server 1402 and/or timing source 1408 depicted in FIG. 14 may be implemented using one or more computers, such as computer 1500.

As shown in FIG. 15, computer 1500 includes one or more processors (e.g., central processing units (CPUs)), such as processor 1506. Processor 1506 may include synchronizer 502 and/or jitter module 506 of FIG. 5; timing module 1108 of FIG. 11; timing module 1208 of FIG. 12; or any portion or combination thereof, for example, though the scope of the example embodiments is not limited in this respect. Processor 1506 is connected to a communication infrastructure 1502, such as a communication bus. In some example embodiments, processor 1506 can simultaneously operate multiple computing threads.

Computer 1500 also includes a primary or main memory 1508, such as a random access memory (RAM). Main memory 1508 has stored therein control logic 1524A (computer software), and data.

Computer 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, computer 1500 may include an industry standard interface, such as a universal serial bus (USB) interface for interfacing with devices such as a memory stick. Removable storage drive 1514 represents a floppy disk drive, a magnetic tape drive, a compact disk drive, an optical storage device, tape backup, etc.

Removable storage drive 1514 interacts with a removable storage unit 1516. Removable storage unit 1516 includes a computer useable or readable storage medium 1518 having stored therein computer software 1524B (control logic) and/or data. Removable storage unit 1516 represents a floppy disk, magnetic tape, compact disc (CD), digital versatile disc (DVD), Blue-ray disc, optical storage disk, memory stick, memory card, or any other computer data storage device. Removable storage drive 1514 reads from and/or writes to removable storage unit 1516 in a well known manner.

Computer 1500 also includes input/output/display devices 1504, such as monitors, keyboards, pointing devices, etc.

Computer 1500 further includes a communication or network interface 1520. Communication interface 1520 enables computer 1500 to communicate with remote devices. For example, communication interface 1520 allows computer 1500 to communicate over communication networks or mediums 1522 (representing a form of a computer useable or readable medium), such as local area networks (LANs), wide area networks (WANs), the Internet, cellular networks, etc. Network interface 1520 may interface with remote sites or networks via wired or wireless connections.

Control logic 1524C may be transmitted to and from computer 1500 via the communication medium 1522.

Any apparatus or manufacture comprising a computer useable or readable medium having control logic (software) stored therein is referred to herein as a computer program product or program storage device. This includes, but is not limited to, computer 1500, main memory 1508, secondary storage devices 1510, and removable storage unit 1516. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, micro-electromechanical systems-based (MEMS-based) storage devices, nanotechnology-based storage devices, as well as other media such as flash memory cards, digital video discs, RAM devices, ROM devices, and the like.

Such computer-readable storage media may store program modules that include computer program logic for synchronizer 502, buffering logic 504, jitter module 506, buffering logic 1104, timing module 1108, timing module 1208, first buffering logic 1418A, and/or second buffering logic 1418B; flowchart 300 (including any one or more steps of flowchart 300), flowchart 400 (including any one or more steps of flowchart 400), flowchart 600 (including any one or more steps of flowchart 600), flowchart 800 (including any one or more steps of flowchart 800), flowchart 1000 (including any one or more steps of flowchart 1000), and/or flowchart 1300 (including any one or more steps of flowchart 1300); and/or further embodiments described herein. Some example embodiments are directed to computer program products comprising such logic (e.g., in the form of program code or software) stored on any computer useable medium. Such program code, when executed in one or more processors, causes a device to operate as described herein.

Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

The invention can be put into practice using software, firmware, and/or hardware implementations other than those described herein. Any software, firmware, and hardware implementations suitable for performing the functions described herein can be used.

III. Conclusion

While various embodiments have been described above, it should be understood that they have been presented by way of example only, and not limitation. It will be understood by those skilled in the relevant art(s) that various changes in form and details may be made to the embodiments described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for synchronizing a plurality of media streams, the method comprising:
  receiving, from a first media server via an asynchronous data network, a first media stream that is generated by a first media source and first timing information that is based on a first timing signal received from a timing source that is not connected to the asynchronous data network;
  receiving, from a second media server that is different from the first media server via the asynchronous data network, a second media stream that is generated by a second media source and second timing information that is based on a second timing signal received from the timing source that is not connected to the asynchronous data network; and
  synchronizing the first media stream and the second media stream based on the first timing information and the second timing information to provide combined media content that is based on the first and second media streams.

2. The method of claim 1, further comprising:
  receiving a third timing signal from the timing source that is not connected to the asynchronous network, the third timing signal corresponding to the first timing signal and the second timing signal;
  wherein synchronizing the first media stream and the second media stream comprises:
    buffering the first media stream using the first timing information and the third timing signal to synchronize the first media stream and the second media stream.

3. The method of claim 2, wherein synchronizing the first media stream and the second media stream further comprises:
  buffering the second media stream using the second timing information and the third timing signal;
  removing jitter from the first media stream in response to buffering the first media stream; and
  removing jitter from the second media stream in response to buffering the second media stream.

4. The method of claim 1, wherein receiving the first timing information comprises:
  receiving, from the first media server via the asynchronous data network, the first timing information that is generated based on the first timing signal received from an atomic clock that is not connected to the asynchronous data network; and
  wherein receiving the second timing information comprises:
    receiving, from the second media server via the asynchronous data network, the second timing information that is based on the second timing signal received from the atomic clock that is not connected to the asynchronous data network.

5. The method of claim 1, wherein receiving the first media stream comprises:
  receiving the first media stream, which includes first visual data and first audio data, the first visual data representing a visual depiction of a first participant of a video conference, the first audio data representing speech of the first participant;
  wherein receiving the second media stream comprises:
    receiving the second media stream, which includes second visual data and second audio data, the second visual data representing a visual depiction of a second participant of the video conference, the second audio data representing speech of the second participant; and wherein synchronizing the first media stream and the second media stream comprises:

synchronizing the first visual data, the first audio data, the second visual data, and the second audio data based on the first timing information and the second timing information to provide combined media content that includes the visual depiction of the first participant, the speech of the first participant, the visual depiction of the second participant, and the speech of the second participant in synchrony.

6. A method for buffering a media stream, the method comprising:

receiving, from a media server via an asynchronous data network, a media stream and timing information that is generated based on a timing signal received from a timing source that is not connected to the asynchronous data network;

receiving a second timing signal from the timing source that is not connected to the asynchronous data network; and buffering the media stream using the timing information and the second timing signal.

7. The method of claim 6, wherein receiving the timing information comprises:

receiving, from the media server via the asynchronous data network, the timing information that is generated based on the timing signal received from an atomic clock that is not connected to the asynchronous data network; and wherein receiving the second timing signal comprises:

receiving the second timing signal from the atomic clock that is not connected to the asynchronous data network.

8. The method of claim 6, wherein receiving the timing information comprises:

receiving, from the media server via the asynchronous data network, the timing information that is generated based on the timing signal received via a first Bluetooth connection from the timing source that is not connected to the asynchronous data network; and wherein receiving the second timing signal comprises:

receiving the second timing signal via a second Bluetooth connection from the timing source that is not connected to the asynchronous data network.

9. The method of claim 6, wherein receiving the timing information comprises:

receiving, from the media server via the asynchronous data network, the timing information that is generated based on the timing signal received in accordance with a wireless communication protocol from the timing source that is not connected to the asynchronous data network; and wherein receiving the second timing signal comprises:

receiving the second timing signal via the wireless communication protocol from the timing source that is not connected to the asynchronous data network.

10. A method for buffering a media stream, the method comprising:

receiving a media stream and timing information regarding the media stream from a media server via an asynchronous data network, the timing information being based on a first timing signal received from a timing source that is not connected to the asynchronous data network;

receiving a second timing signal that is based on the first timing signal from the media server via a path that does not include the asynchronous data network; and buffering the media stream using the timing information and the second timing signal.

11. The method of claim 10, wherein the timing information is based on the first timing signal received from an atomic clock that is not connected to the asynchronous data network.

12. The method of claim 10, wherein the timing information is based on the first timing signal received via a Bluetooth connection from the timing source that is not connected to the asynchronous data network.

13. The method of claim 10, wherein the timing information is based on the first timing signal received in accordance with a wireless communication protocol from the timing source that is not connected to the asynchronous data network.

14. A method for buffering a media stream, the method comprising:

receiving a media stream and timing information regarding the media stream from a media server via an asynchronous data network, the timing information being based on a first timing signal;

providing the first timing signal to the media server via a path that does not include the asynchronous data network, the first timing signal being based on a second timing signal;

receiving the second timing signal from a timing source that is not connected to the asynchronous data network; and buffering the media stream using the timing information and the second timing signal.

15. The method of claim 14, wherein receiving the second timing signal comprises:

receiving the second timing signal from an atomic clock that is not connected to the asynchronous data network.

16. A router coupled between a media server and a client, the router comprising:

input circuitry configured to receive a media stream and timing information regarding the media stream from the media server via an asynchronous data network;

a timing module configured to provide a timing signal to the client via a path that does not include the asynchronous data network; and output circuitry configured to provide the media stream and the timing information to the client via the asynchronous data network to enable the client to buffer the media stream using the timing information and the timing signal.

17. A system comprising:

an audio server that provides a first audio stream and a second audio stream via an asynchronous data network;

a first speaker that buffers the first audio stream, which is received from the audio server via the asynchronous data network, based on a first timing signal that is received from a timing source that is not connected to the asynchronous data network; and a second speaker that buffers the second audio stream, which is received from the audio server via the asynchronous data network, based on a second timing signal that is received from the timing source that is not connected to the asynchronous data network.

18. The system of claim 17, wherein the timing source is an atomic clock.

19. The system of claim 17, wherein the first speaker buffers the first audio stream based on the first timing signal that is received via a first Bluetooth connection from the timing source that is not connected to the asynchronous data network; and wherein the second speaker buffers the second audio stream based on the second timing signal that is received via a second Bluetooth connection from the timing source that is not connected to the asynchronous data network.

20. The system of claim 17, wherein the first speaker buffers the first audio stream based on the first timing signal that is received in accordance with a wireless communication protocol from the timing source that is not connected to the asynchronous data network; and wherein the second speaker buffers the second audio stream based on the second timing signal that is received in accordance with the wireless communication protocol from the timing source that is not connected to the asynchronous data network.

* * * * *